United States Patent
Pollard et al.

(10) Patent No.: US 6,549,917 B1
(45) Date of Patent: Apr. 15, 2003

(54) SYNCHRONIZATION OF HOST COMPUTERS AND HANDHELD REMOTE COMPUTERS

(75) Inventors: Thomas G. Pollard, San Diego, CA (US); David B. Cook, San Diego, CA (US)

(73) Assignee: WaveWare Communications, Inc., San Diego, CA (US)

( * ) Notice: Subject to any disclaimer, the term of this patent is extended or adjusted under 35 U.S.C. 154(b) by 0 days.

(21) Appl. No.: 09/303,095

(22) Filed: Apr. 29, 1999

(51) Int. Cl.[7] .............................................. G06F 17/30
(52) U.S. Cl. ...................... 707/201; 707/202; 707/203; 707/204
(58) Field of Search ............... 705/11, 9; 707/201–204, 707/4; 379/88.09; 709/217–219, 227–229; 714/12, 15, 21

(56) References Cited

U.S. PATENT DOCUMENTS

| | | | | |
|---|---|---|---|---|
| 5,182,705 A | * | 1/1993 | Barr et al. ................... | 364/401 |
| 5,758,355 A | * | 5/1998 | Buchanan .................... | 707/201 |
| 5,775,996 A | * | 7/1998 | Othmer et al. ................ | 463/40 |
| 5,835,785 A | * | 11/1998 | Overtoom et al. | |
| 5,857,201 A | * | 1/1999 | Wright et al. ................ | 707/104 |
| 5,984,786 A | * | 11/1999 | Ehrman ........................ | 463/42 |
| 6,000,000 A | * | 12/1999 | Hawkins et al. ............ | 707/201 |
| 6,070,160 A | * | 5/2000 | Geary ............................ | 707/4 |

* cited by examiner

Primary Examiner—Hosain T. Alam
Assistant Examiner—Tam Nguyen

(57) ABSTRACT

A handheld client computer and a host computer are synchronized through a data channel, preferably a high-latency data channel, by transferring from the handheld client computer to a cache in the host computer a skeletal snapshot of the client records, including the identification and address of each of the client records. An up-transfer list of client records to be transferred from the client computer to the host computer is determined. The records on the up-transfer list are up-transferred from the handheld client computer to the cache of the host computer and associated with the skeletal snapshot, so as to be available to a record synchronization operation. A set of updated host records to be down-transferred is received from the record synchronization operation. The step of up-transferring is preferably initiated prior to the initiation of the step of receiving from the record synchronization operation. The method includes down-transferring from the host computer to the handheld client computer the set of updated host records to be down transferred, and also storing the updated host records in the cache associated with the skeletal snapshot. The steps of up-transferring and down-transferring are accomplished in a full-duplex, asynchronous manner. A complete status and the set of host records of the handheld client computer may be up-transferred to the cache to form a virtual client computer. The virtual client computer may be stored on a mass storage device and updated incrementally during subsequent synchronization sessions.

18 Claims, 3 Drawing Sheets

SYNCHRONIZATION OF HOST COMPUTERS AND HANDHELD REMOTE COMPUTERS

BACKGROUND OF THE INVENTION

This invention relates to computer systems, and, more particularly, to the synchronization of data between a host computer and a handheld client computer.

As a result of increases in computing power and available on-board memory, handheld or palmtop computers have the potential to replace laptop and desktop computers in many situations. Most uses of handheld computers to date have been oriented toward stand-alone applications such as an individual keeping a calendar and phone list, note taking, and the like. However, handheld computers are being increasingly used in corporate and public data networks (e.g., the Internet). In such systems, a host computer serves as the central data-storage site and manager of a number of handheld client computers. The client computers communicate with the host computer, but not with each other.

For example, each salesperson of a company may keep a local copy of a data base including records of customer information, inventory, catalogs, up-to-date pricing information, and other relevant data. The local database is stored on the salesperson's handheld client computer. A master corporate database containing a similar record set is stored in the host computer. The updating of the handheld client databases is accomplished using the handheld client computer communicating with the host central computer via a data channel such as a direct hookup, a telephone line, a wireless link, or the Internet. At the same time, the handheld database sales records may be automatically transferred to the host computer from the client computers, thus allowing the central sales records to be updated.

One of the important issues in the development of such host/client systems is the synchronization of the data records of the host computer and the individual handheld client computers. Each time a data record within either the host computer or one of the client computers changes, there is a question of whether the corresponding records in the other computers of the system should be altered responsively, or "synchronized" to it. In the salesperson example, a sale by one salesperson decreases the available inventory of that item, or manufacturing operations may increase the available inventory of that item. It is desirable that the host computer and, through the host computer, every other salesperson's client computer be made aware of the up-to-date inventory status by synchronization of the applicable inventory records.

Record synchronization is a complex process because the communication between the host computer and each client computer occurs only when the data links are made on an occasional basis. Synchronization is also complex because it entails more than just blindly matching data bases. For example, if an error is made in a data entry on one of the client computers, during synchronization the host computer may seek to discover the error and not synchronize the records on the other client computers if an error is suspected. Record synchronization techniques are available to achieve synchronization of the records of two data bases that may be tailored to account for such issues.

The present inventors have observed that the record synchronization process may require long connection times between the host computer and each individual client computer, particularly when the data channel is a "high-latency" data channel that has inherent delays which are long compared to the cycle time of the CPUs of the host and the client computers. Examples of commonly used high-latency data channels are telephone lines, wireless links such as cellular phone systems, and shared data networks such as the Internet. The inventors have observed that, regardless of the processing speeds of the CPUs of the two linked computers, the inherent delays in the data channel may result in unacceptably or uneconomically long synchronization times. It is not practical in many cases to avoid the use of high-latency data channels, since they are the most universally available data channels for most remote users of the handheld computers.

There is a need for an approach for speeding the record synchronization process, particularly in those cases where a high-latency data channel is used. The present invention fulfills this need, and further provides related advantages.

SUMMARY OF THE INVENTION

The present invention provides a software synchronization communication architecture that reduces the synchronization time of a host computer and a remote handheld client computer. The approach is generally applicable, although it is most beneficially applied when the host computer and the client computer communicate through a high-latency data channel. It may be utilized in conjunction with existing or future record synchronization techniques, and serves not to alter these record synchronization techniques but to operate in conjunction with them to speed the synchronization.

In accordance with the invention, a method for communicating synchronization information between at least one handheld client computer and a host computer comprises the steps of providing a host computer having a set of host databases (each comprising a set of data records) stored therein, providing a handheld client computer having a set of client databases stored therein and database/record change-indicators corresponding to those client databases/records which have been changed since the last prior synchronization, providing a data channel between the host computer and the handheld client computer (typically a high-latency data channel such as a telephone line, a wireless communications channel, or the Internet), establishing a data-link between the host computer and the handheld client computer through the data channel, and transferring from the handheld client computer to a cache in the host computer a skeletal snapshot of the client databases. The client database/record change-indicators may range from a simple flag indicating the occurrence and type of the change to a detailed time-stamp indicating the change type and the exact time of the change. The skeletal snapshot may include any information indicating the state of the remote databases and records, such as, for example, change-indicators and time-stamps, unique identifiers (e.g., database/record identification numbers), and/or database/record indices in an ordered list.

An up-transfer list of client records to be transferred from the client computer to the host computer is determined. The up-transfer list is determined by the communications architecture using the skeletal snapshot retrieved from the client computer and any a priori information known about the objectives and requirements of the synchronization to be performed. This a priori information may be estimated based upon typical synchronization rules or past synchronization history, but is not deterministically known. The detailed discussion of the preferred embodiment of the invention discusses examples of the skeletal information and the a priori knowledge used to determine the up-transfer list of client records. The records on the up-transfer list are up-transferred from the handheld client computer to the cache of the host computer and are associated with the skeletal snapshot, so as to be available to a record synchronization operation.

The method includes receiving from the record synchronization operation a set of updated and added host records to be down-transferred, as well as a set of requests to delete client records, wherein the step of up-transferring is initiated prior to an initiation of the step of receiving and down-transferring from the host computer to the handheld client computer the set of updated and added host records and the set of record deletion requests. The method further includes storing the updated and added host records in, and removing the deleted records from, the cache associated with the skeletal snapshot. The steps of up-transferring and down-transferring are accomplished in a full-duplex, asynchronous manner, thereby keeping the data channel as fully filled as possible.

The present approach establishes a skeletal snapshot of the client databases/records in a cache of the host computer, so that the host has ready access to this information for reference during synchronization. Based upon the skeletal snapshot of the client databases/records, it also identifies the client records of the handheld client that are to be up-transferred, and desirably immediately begins the up-transfer without waiting for further operations of the record synchronization. Thus, the up-transfer preferably proceeds without waiting for the record synchronization software to be fully loaded and ready for operation. The result is a shorter elapsed time for the up-transfer of the required client records, so that the client records are available in the host cache more quickly to permit the initiation and continuous functioning of the record synchronization.

The synchronized record output of the record synchronization function is stored in the host cache and also down-transferred to the handheld client computer, with the up-transfers and down-transfers proceeding in the full-duplex, asynchronous manner. The synchronized record output stored in the host cache is available for any further use by the host computer in the synchronization process. Absent this storage in the cache, the host may be required to up-transfer needed and previously synchronized records back from the client computer, wasting the bandwidth of the communications channel.

As the record synchronization proceeds, it is not uncommon that the record synchronization operation identifies additional client records that are required to accomplish the synchronization. Such additional client records are added to the up-transfer list as they are identified and up-transferred from the client computer to the host computer.

The use of the cache may be expanded by creating a virtual replica of the handheld computer within the cache of the host computer. To create the virtual client computer, the computer status and databases of the physical client computer are up-transferred to the cache of the host computer. The initial creation and population of the virtual client computer is time-consuming, but subsequent synchronization and modification of the virtual client computer are incremental and substantially faster. In addition to storing the handheld computer's databases and status, the virtual client computer software may include routines for accessing and manipulating the stored data which mirror the operating system routines available on the handheld computer, and may, but not necessarily, include the operating system of the handheld computer. Having constructed and populated the virtual client computer, the synchronization operation may then be conducted in two stages. The first stage is a synchronization between the host databases and the virtual client computer. The second synchronization stage includes the up-transfer and down-transfer between the virtual client computer and the physical client computer when a physical connection is established, completing the synchronization of the client computer and the host computer. Such a two-stage synchronization may be preferable and more efficient in some cases, for example where the host computer databases are large and shared by numerous users and host computer access to the host databases is time-consuming. Breaking the synchronization into the two independent stages may reduce the time required for the physical client computer to be connected to the host computer relative to a one-stage synchronization where the client and host databases are synchronized directly without the use of a virtual device.

Once the virtual client computer is created in the cache, it may be stored in mass storage of the host computer, thereby serving as a backup of the entire physical client computer. The virtual client computer may also be down-transferred to the original client computer if it experiences a mechanical or electrical failure resulting in the inadvertent deletion of the client databases, or if there is a failure in the communications portion of the record synchronization operation. The virtual client computer may also be down-transferred from the host computer to another physical client computer, in the event that a duplicate client computer is required for any reason.

This approach is to be contrasted with the conventional software architecture and communication approach for synchronization. Conventional communications approaches operate in a half-duplex, synchronous manner. No effort is made by the communications software to determine lists of records to be up-transferred and down-transferred. No skeletal information is pre-fetched by the communications software prior to the execution of the synchronization program. No effort is made by the communications software to pre-fetch or cache records to be up-transferred or down-transferred. In conventional communications approaches, the communications module acts purely in response to requests from the synchronization program. Each request (e.g., to retrieve a record from the client computer, delete a record from the client computer, add a record to the client computer, etc.) is sent to the client computer, the response is retrieved from the client computer, and the communications software returns the response to the synchronization program. The synchronization program may not initiate a request until the previous request has been executed and a response returned. In the conventional approach, there is no integration and coordination between the synchronization program and the communications software, and there is no virtual device memory of the state and progress of the previous synchronization session.

The above-described communications methodology is accomplished with knowledge only of the client computer and its client databases/records, and without knowledge of the host records and the specific details of the record synchronization operation. The requirements of the synchronization operation are initially estimated based upon typical or past behavior. This situation is often encountered in practice, where the communications program is a software routine that does not receive this information from the synchronization software. Improved performance may be achieved by further integrating the communications methodology with the synchronization program. Significant performance improvement may be achieved with firm knowledge of the host computer's database/record skeletal information and the synchronization rules to be applied to the data sets. This information could be requested by the communications logic at the onset of the synchronization session. Further improved performance can be achieved by integrating the communications logic and synchronization program into a single module. Full integration allows optimal creation of the initial up-transfer and down-transfer record lists and immediate modification of these lists as more information is determined during the synchronization process.

The present approach significantly reduces the record synchronization time in a host/client computer system, particularly where the two computers are linked by a high-latency data channel. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
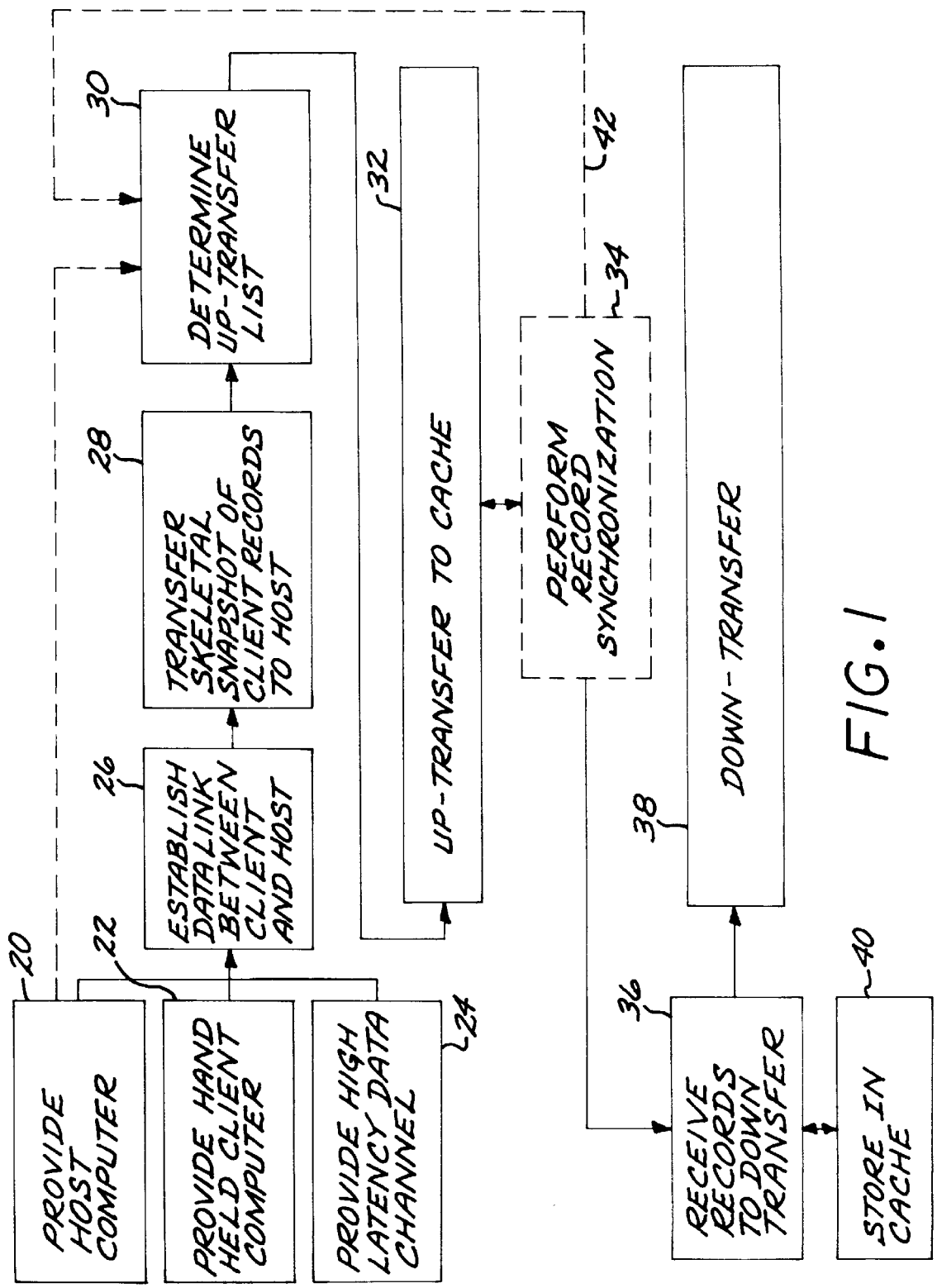
FIG. 1 is a block flow diagram of an approach for practicing the invention.
Figure 2:
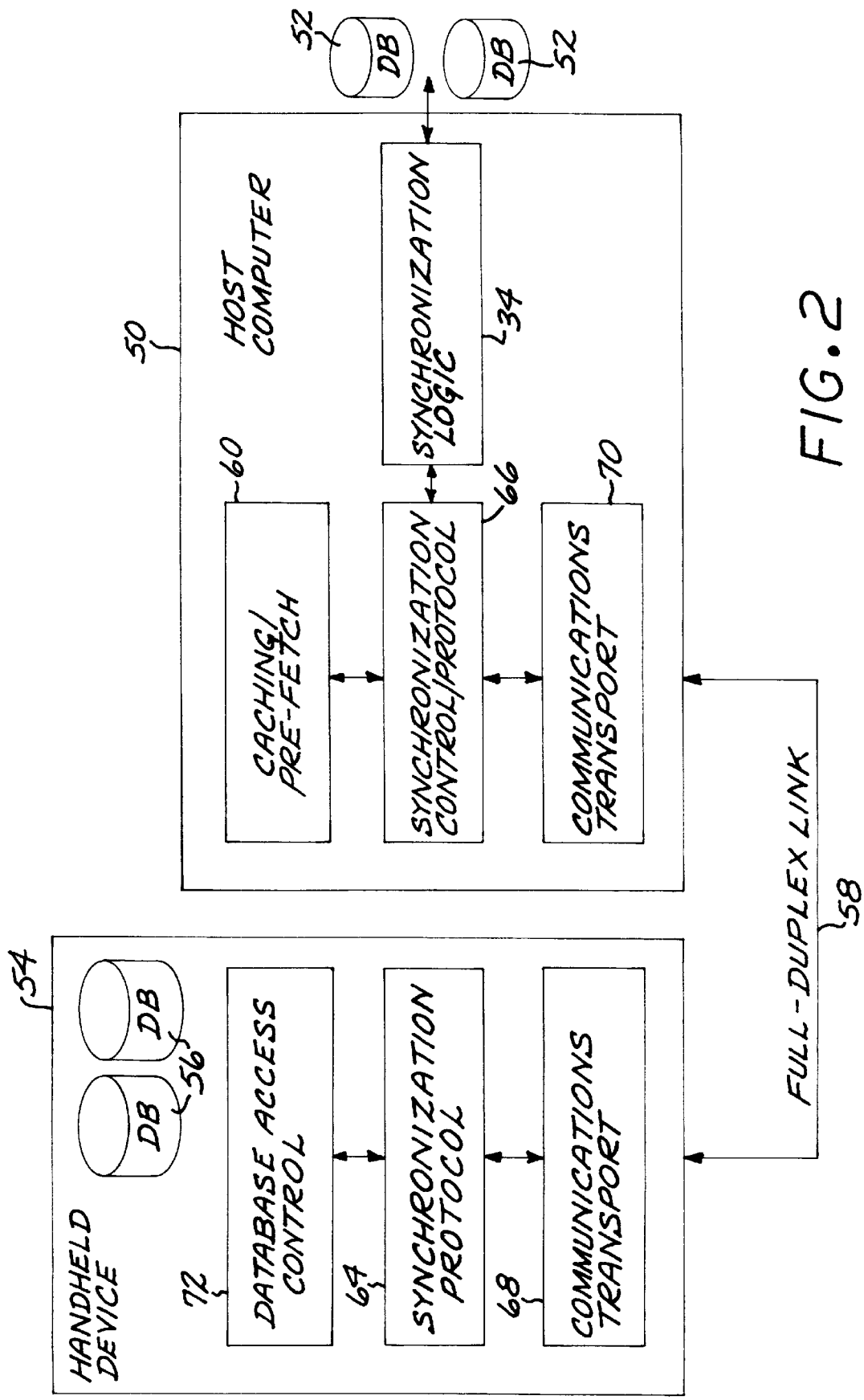
FIG. 2 is a schematic illustration of a first embodiment of a preferred host/client architecture for practicing the invention.

FIG. 1 depicts a preferred approach for practicing the communications method of the invention. FIG. 2 schematically illustrates the preferred system architecture in which this communications method is practiced. These two figures are referenced simultaneously in the detailed description which follows.

A host computer 50 is provided, numeral 20. The host computer 50 includes a set of host records 52 stored in databases therein. Examples of the host computers 50 operational at the present time include computers running Microsoft Windows™ operating systems, computers running versions of the Unix operating system (e.g., Linux), and computers running the Apple Macintosh™ operating system. A handheld client computer 54 is provided, numeral 22. The handheld computer 54 has a set of client records 56 stored in databases therein. Examples of the handheld client computers 54 available at the present time include the 3 Com Palm Connected Organizer™, the Philips Nino™, the Psion Series 5™, and the Franklin Rex Pro™ computers. The handheld computer 54 also has stored therein a client record flag set corresponding to those client records 56 which have been changed since the last prior synchronization. During ordinary operation of the handheld computer 54, when a client record is first changed after a synchronization (including modifications, additions, or deletions), the corresponding record flag is set to indicate the change.

A data channel 58 is provided, numeral 24. The data channel 58 may be of any operable type, but the present invention is most beneficially applied when communication between the two computers 50 and 54 is via a high-latency data channel, and the following discussion is directed toward the use of such a high-latency data channel 58. The high-latency data channel 58 is a data channel wherein the one-way data propagation time exceeds a latency time of about 1 millisecond. In such high-latency data channels, the large propagation time to transfer information serves to impede the synchronization operation. Greater advantages using the present approach are obtained if the latency time exceeds about 10 milliseconds, and yet further advantages are obtained if the latency time exceeds about 100 milliseconds. Examples of high-latency data channels include land telephone lines, wireless lines such as cellular telephone lines, and public or private data networks such as the Internet.

A bi-directional data link is established between the host computer 50 and the handheld computer 54, through the high-latency data channel 58, numeral 26, as indicated by the double-ended arrow in FIG. 2.

Upon establishment of the data link, a skeletal snapshot of the client records 56 is transferred from the handheld client computer 54 to a cache 60 of the host computer 50, numeral 28. The skeletal snapshot of the client records includes basic information about the client databases and records 56, but does not include the client records themselves. For each of the databases 56 to be synchronized on the handheld client computer 54, the skeletal snapshot may include the number of records in the client database, the next record identifier to be used for records added to the client database, unique record identifiers and record indices of each of the client records 56 in the database of the memory of the handheld client computer 54, and change flag information for each of the records 56 in the database. This skeletal information is transferred in very little time, but it provides the host computer 50 with directly accessible information on the nature of the client records that are available to the host computer 50. Each time the host computer 50 seeks to up-transfer, modify, or delete a record on the client computer 54, it first may check the skeletal information in the cache to determine whether such a record in fact exists as a client record 56 on the client computer 54 and whether that record has been changed. The skeletal information retrieved may also include information detailing the version of the operating system software on the handheld computer 54, the identification of the host computer for the previous synchronization session, and the success/failure status of the previous synchronization session. The skeletal information retrieved has the potential for saving extensive overall synchronization time by avoiding attempts to access nonexistent or unmodified client databases or records, by filtering unsupported requests (as dictated by the handheld's operating system software) to the handheld client computer, and by indicating the expected form of the current synchronization (as predicated by the form and status of the prior synchronization).

An up-transfer list of client records to be transferred from the client computer 54 to the host computer 50 is determined, numeral 30. These are the client records 56 which the host computer 50 estimates will be needed for the synchronization operation. A first approximation at an up-transfer list is made immediately, so that the up-transfer of these client records can commence immediately, without waiting for any other operations. In the preferred approach, the required synchronization is identified as either a fast synchronization or a slow synchronization. A "fast" synchronization is allowed and assumed if the last prior computer with which the handheld client computer was synchronized was the host computer 50. The up-transfer list for a "fast" synchronization includes only those client records 56 with the change flag set. The up-transfer list includes all client records 56 if the last prior computer with which the handheld client computer 54 was synchronized was a computer other than the host computer 50, thus requiring a "slow" synchronization.

Once the initial up-transfer list is available, up-transferring of client records 56 from the client computer 54 to the cache 60 of the host computer 50 preferably, but not necessarily, begins immediately, numeral 32, without waiting for other operations to be initiated or completed. Initiating the up-transferring 32 immediately yields the greatest improvement in synchronization time, but a later initiating of the up-transferring 32 also produces substantial benefits. Desirably, up-transfer 32 is not delayed for loading of any record synchronization operations software or any other actions. Up-transfer continues as long as necessary to supply the client records 56 required for record synchronization or until the communications software determines that the initial up-transfer list was in error. This determination may be made based upon the sequence of requests from the synchronization logic 34. If the request sequence is inconsistent with the list of records being up-transferred, the up-transfer is canceled.

The record synchronization is performed, numeral 34. This operation is shown in a dash-line box, because the actual record synchronization is not a part of the present invention, which deals with communication between the two computers 50 and 54. The record synchronization 34 may be performed by any operable approach. A wide variety of record synchronization programs are available, and in most cases would be customized for each host/client data system. The present communications method treats the record synchronization operation 34 as a black box, and serves only to provide records to that operation 34 and to receive updated records back from that operation 34.

As the record synchronization operation 34 is performed, updated host records 52 are received, numeral 36. The records received 36 may be modifications to client records, additions to the client database, or requests to delete records from the client database. These updated or added (synchronized) host records 52 and deletion requests are down-transferred from the host computer 50 to the client computer 54. The updated or added host records are also stored in the cache 60, numeral 40, for possible subsequent use in the record synchronization operation 34. Deletion requests are reflected in the cache 60 by removing the record from the cache.

It is common that the record synchronization operation 34 requires additional client records 56 (not estimated for inclusion in the initial up-transfer list) to perform the synchronization function. When such additional client records 56 are required, each such additional client record is added to the up-transfer list, as indicated by the line 42. The additional client record is then up-transferred, numeral 32.

The synchronization control and protocol module 64 of the host computer 50 and the synchronization protocol module 66 of the handheld client computer 54 perform the high-level communications functions and decision-making between the two computers, including presenting an application programming interface (API) to the synchronization logic 34, formatting of synchronization requests and responses for transmission, and transmission and retrieval of synchronization requests and responses via respective communications transport modules 68 and 70. The synchronization control and protocol module 66 on the host computer 50 has the additional responsibility to retrieve the handheld skeletal information from the handheld computer 54 at the outset of the synchronization session, to store the skeletal information and records in the cache 60, and to retrieve records as from the cache 60 when requested. The synchronization protocol module 64 on the handheld computer 54 receives the requests via the communications transports 68 and 70, interprets the requests from the host computer 50, executes them using a database access control module 72, and responds to the requests using the communications transport module 68.

The communications transport module 70 on the host computer 50 and communications transport module 68 on the handheld computer 54 act as a reliable transport, guaranteeing the error-free delivery of data during the synchronization session. The current preferred embodiment of the invention uses the TCP/IP protocol, but any reliable protocol will work for the purposes of the invention. The invention does not require knowledge of the structure and performance of the communications transport module 70.

The database access control module 72 provides an API allowing the manipulation of the databases 56 of the handheld computer 54. The database access control module is typically included as part of the handheld computer operating system software and allows manipulations including database creation or deletion, record creation or deletion, and record modification. Modifications to records via the database access control module 72 result in the setting of the change flags used during the synchronization session. The invention does not require knowledge of the structure and performance of the database access control module 72.

The elements 64, 66, 68, 70, and 72 are hardware elements of the respective commercially available computers 50 and 54, and are accordingly well known in the art.

The up-transfer 32 and the down-transfer 38 are conducted in a full-duplex, asynchronous manner. This simultaneous transfer of information in both directions between the host computer 50 and the handheld client computer 54 maximizes the utilization of the communications channel. This approach minimizes communication waiting time, and thence minimizes the total time required to complete any required record synchronization operations. Up-transfers 32 and down-transfers 38 may be accomplished in background, while the foreground of the host computer 50 proceeds with other tasks.

The overall efficiency of the record synchronization operation may be further improved if the synchronization logic 34 provides to the synchronization protocol an initial list of client records 56 that are required, when the up-transfer list is first determined, as indicated by the line 44. Alternatively, the synchronization logic 34 may provide the synchronization protocol with skeletal information on the host databases 52 and the synchronization rules to be used by the synchronization logic. Given the handheld database skeletal information retrieved at the beginning of the synchronization session, the host database skeletal information, and the synchronization rules in use, the synchronization protocol may build a much more accurate up-transfer list. Most record synchronization programs available today do not make this information available. However, at such time as record synchronization programs do make such an initial list of required client records available, or provide skeletal information and synchronization rules, the communications approach of the present invention will accommodate this information, with the result of further-improved communications efficiency.

Figure 3:
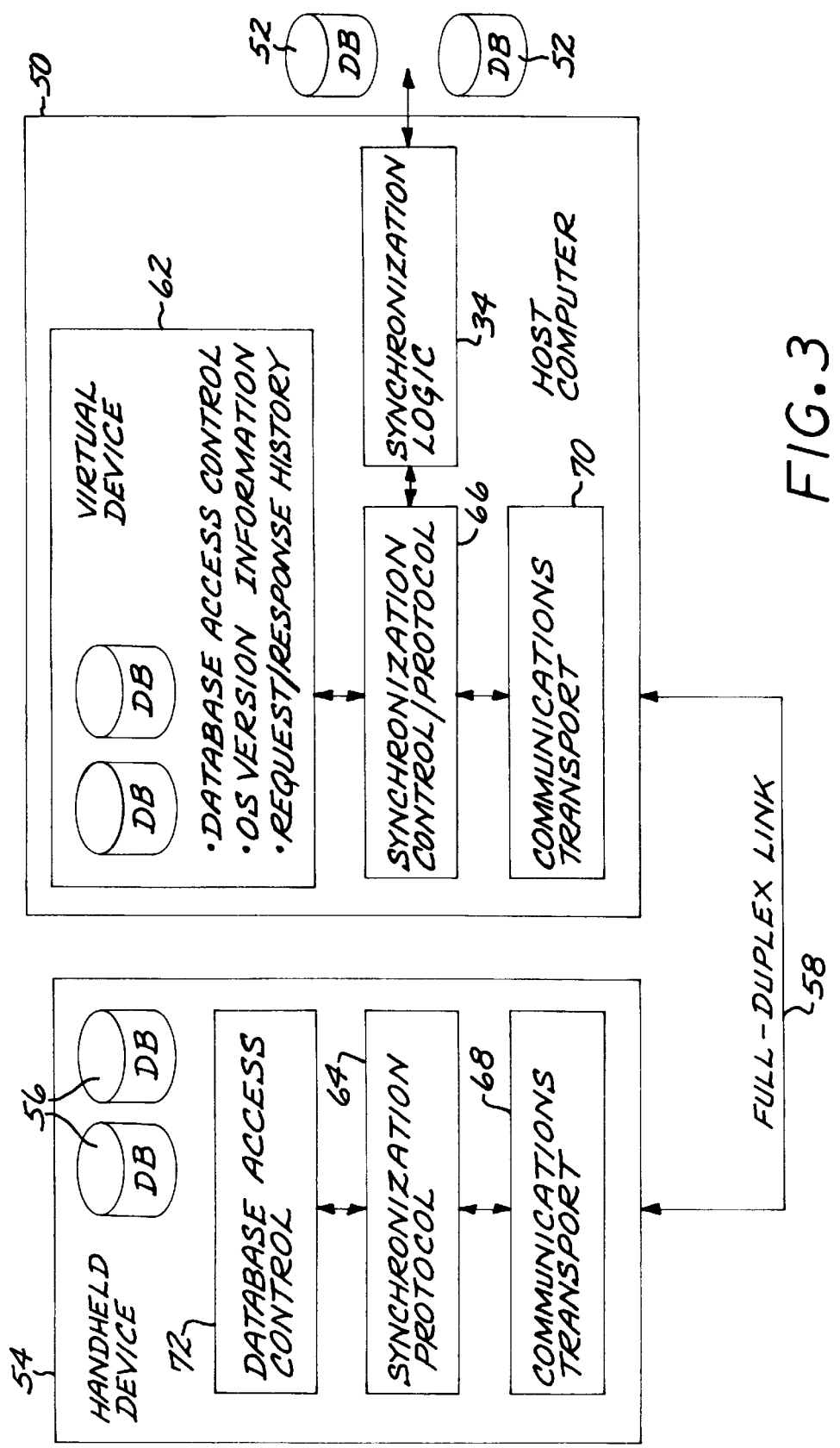
FIG. 3 is a schematic illustration of a second embodiment of a preferred host/client architecture for practicing the invention.

The present approach of FIG. 1 may be extended to the creation of a "virtual client computer" 62 within the memory of the host computer 50, as illustrated in FIG. 3. In FIG. 3, the same numerical identifiers as in FIG. 2 have been used where appropriate, and the prior discussion of these elements is incorporated here. To create the virtual client computer 62, the complete status of the physical handheld client computer 54 is transferred from the client computer 54 to the host computer 50, in step 28. This information includes the skeletal snapshot of the client records 56, the status information of the physical client computer 54 including identification information, passwords, request/response history, and the content of the client records 56 themselves to the extent they are not already present in the virtual computer 62 found in the cache 60. The virtual client computer also includes routines for accessing and manipulating the stored databases which mirror the operating system routines available on the physical handheld computer. The information may optionally include applications programs and the entire operating system of the client computer.

The virtual client computer 62 is therefore essentially a software replica of the physical handheld client computer 54, stored in the memory of the host computer 50. The presence of the virtual client computer 62 in the host computer has several advantages. A partial record synchronization operation 34 may be performed directly with the virtual client computer 62, avoiding the need for accessing and communicating further client records 56 from the client computer 54, which is usually the slowest of the steps of the record synchronization operation. Once the record synchronization with the virtual client computer 62 is complete, record modifications (additions, deletions, and changes) may be up-transferred from the physical handheld client computer 54 to the virtual client computer 62, numeral 32, and down-transferred from the virtual client computer 62 to the physical handheld client computer 54, numeral 38, when a physical data channel link is available, thus completing the synchronization. The virtual device may also store a history of the synchronization actions taken during a synchronization session. If the record synchronization between the physical handheld client computer 54 and the host computer 50 is interrupted, such as due to a loss of the data channel 58, the record synchronization of the virtual client computer 62 may be completed at the beginning of the next synchronization session using the stored virtual device databases and the stored synchronization request/response history.

The virtual client computer 62 may be also stored to a mass storage device of the host computer 50 for use at a later time. For example, if a duplicate of the physical handheld computer 54 is required, because of loss or damage, for example, the virtual client computer may be retrieved from the mass storage device and then down-transferred into a second physical handheld computer 54.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for communicating synchronization information between at least one handheld client computer and a host computer, comprising the steps of:

providing a host computer having a set of host databases stored therein;

providing a handheld client computer having a set of client databases stored therein and database/record change-indicators corresponding to those client databases/records which have been changed since the last prior synchronization;

providing a data channel between the host computer and the handheld client computer;

establishing a data-link between the host computer and the handheld client computer through the data channel;

transferring from the handheld client computer to a cache in the host computer a skeletal snapshot of the client databases, wherein the skeletal snapshot includes at least one state indicator selected from the group consisting of the state of the remote databases/records, change-indicators and time-stamps, unique identifiers, and database/record indices in an ordered list;

determining an up-transfer list of client records to be transferred from the client computer to the host computer;

up-transferring from the handheld client computer to the cache of the host computer the records on the up-transfer list and associating the up-transferred records on the up-transfer list with the skeletal snapshot, so as to be available to a record synchronization operation;

receiving from the record synchronization operation a set of updated host records to be down-transferred and requests to delete client records; and down-transferring from the host computer to the handheld client computer the set of updated host records to be down transferred, and also storing the updated host records in the cache associated with the skeletal snapshot, the steps of up-transferring and down-transferring being accomplished in a full-duplex, asynchronous manner.

2. The method of claim 1, including an additional step of storing the updated and added host records in, and removing the deleted records from, the cache associated with the skeletal snapshot.

3. The method of claim 1, wherein the step of determining includes the step of the host computer selecting a host listing of client records to be up-transferred based on information received from the synchronization operation, and adding the host listing to the up-transfer list.

4. The method of claim 1, wherein the data channel is a high-latency data channel.

5. The method of claim 1, wherein the step of providing a data channel comprises the step of providing a data channel selected from the group consisting of a telephone data channel, a wireless data channel, and a shared data network.

6. The method of claim 1, including an additional step, after the step of up-transferring has been initiated, of adding at least one additional client record to the up-transfer list, and wherein the step of up-transferring includes up-transferring the at least one additional client record on the up-transfer list.

7. The method of claim 1, wherein the step of transferring from the handheld client computer to a cache in the host computer further includes transferring a complete status of the handheld client computer to the cache to form a virtual client computer.

8. The method of claim 1, wherein, in the step of determining an up-transfer list of client records, the up-transfer list includes only those client records of the client record flag set if the last prior computer with which the hand-held client computer was synchronized was the host computer, and the up-transfer list includes all client records if the last prior computer with which the hand-held client computer was synchronized was a computer other than the host computer.

9. The method of claim 1, wherein the step of up-transferring is initiated prior to an initiation of the step of receiving.

10. A method for communicating synchronization information between at least one handheld client computer and a host computer, comprising the steps of:

providing a host computer having a set of host records stored therein;

providing a handheld client computer having a set of client databases stored therein and a client record flag set corresponding to those client records which have been changed since the last prior synchronization;

providing a data channel between the host computer and the handheld client computer;

establishing a data-link between the host computer and the handheld client computer through the data channel;

up-transferring from the handheld client computer to a cache in the host computer a complete status and the set of host records of the handheld client computer to the cache to form a virtual client computer, so as to be available to a record synchronization operation;

receiving from the record synchronization operation a set of updated host records, wherein the step of up-transferring is initiated prior to an initiation of the step of receiving;

storing the updated host records in the cache to update the virtual client computer; and down-transferring from the host computer to the handheld client computer the set of updated host records to be down transferred, the steps of up-transferring and down-transferring being accomplished in a full-duplex, asynchronous manner.

11. The method of claim 10, including an additional step, after the step of storing the updated host records in the cache, of storing the contents of the cache in a mass storage device.

12. The method of claim 10, including additional steps, after the step of down-transferring, of down-transferring from the host computer to the handheld client computer the virtual client computer of the cache.

13. The method of claim 10, wherein the data channel is a high-latency data channel.

14. The method of claim 10, wherein the step of providing a data channel comprises the step of providing a data channel selected from the group consisting of a telephone data channel, a wireless data channel, and a shared data network.

15. The method of claim 10, including additional steps, after the step of down-transferring, of providing a second handheld client computer, and down-transferring from the host computer to the second handheld client computer the virtual client computer of the cache.

16. The method of claim 10, including an additional step of performing a record synchronization operation with the virtual handheld client computer in the cache.

17. The method of claim 16, including an additional operation, after the step of performing a record synchronization operation with the virtual handheld client computer in the cache, of performing a record synchronization operation between the virtual handheld client computer in the cache and the handheld client computer.

18. The method of claim 10, wherein the step of up-transferring is initiated prior to an initiation of the step of receiving.

* * * * *